Patented Sept. 20, 1949

2,482,635

UNITED STATES PATENT OFFICE 2,482,635

PROVITAMIN A

Harold G. Petering, Kalamazoo, and Wilbur H. Petering, Detroit, Mich., assignors to Research Corporation, New York, N. Y., a nonprofit corporation of New York No Drawing. Application January 31, 1947, Serial No. 725,740

19 Claims. (Cl. 99—11)

This invention relates to a process for treating dried plant products containing carotene and provitamin A, more particularly to a process for stabilizing provitamin A and carotene contained therein against deterioration during storage.

The role of alpha- and beta-carotene, zeaxanthin, cryptoxanthin, carotenoids and related lipoids, and of other provitamins A, referred to herein broadly and collectively as provitamins A, in practical animal nutrition is recognized as of great importance and a great deal of effort has been exerted to develop methods for harvesting crops rich in provitamins A, such as alfalfa and other hay crops, and to process them in such manner that the provitamins A do not deteriorate during storage of the feed. One of the methods used most widely in attempting to accomplish the preservation of the provitamin A content of harvested plant tissue is the rapid dehydration process. This process is usually carried out using hot air and is practiced widely in the preparation of dehydrated alfalfa leaf meal and other dehydrated cereal grasses.

Although dehydrated alfalfa leaf meal, dehydrated cereal grasses and other such products are substantially better than the same product in the form of sun-cured hay insofar as the retention of the provitamin A content during drying is concerned, it is nevertheless true that decomposition of the provitamin A occurs rapidly during storage at ordinary temperatures.

When dehydrated alfalfa leaf meal is stored at temperatures ordinarily occurring in warehouses as much as fifty per cent of the provitamin A originally in the dehydrated meal may be destroyed in a few weeks or months. Manufacturers and users of dehydrated alfalfa meal have recognized the seriousness of this loss and have attempted to overcome it by storing a season's supply in refrigerated storage rooms. If the temperature is sufficiently low, the destruction is substantially minimized, but the cost of refrigerating such bulky, low-value agricultural crops is very great, and to most users, prohibitive. Furthermore, even though the product is refrigerated during storage and the provitamin A content thereby stabilized to some extent for that period, when this material is mixed into feeds, the provitamin A deteriorates rapidly due to its exposure to normal temperatures and contact with the air. Thus, during the period between mixing and ultimate use a considerable amount of provitamin A is lost. The same situation exists in the case of other hay crops and cereal feeds.

It has also been suggested to extract the provitamin A from the plant tissue, and, after purifying it somewhat, to re-mix it with the feedstuff prior to use. This method has even been practiced to some extent, but its uneconomical nature is apparent.

Although it is known that certain substances, such as tocopherols and lecithins, occurring naturally in most provitamin A-containing substances exert a stabilizing influence on provitamin A, little or no success has been attained in attempting to utilize such substances in situ. It is thought that such stabilizing substances and provitamins A occur in different parts of the plant structure, or perhaps even in different parts of the same cells, and that they are prevented from coming into contact with one another by the cell tissues, particularly after the tissues have been dried. The need for an economical and simple process whereby the provitamin A content of agricultural feeds may be stabilized against deterioration during storage to a greater extent than has heretofore been possible is apparent.

Accordingly, it is an object of the present invention to provide a simple and economical method for stabilizing provitamin A occurring naturally in plant products.

Another object is to provide a method for processing an animal food containing provitamin A to render the provitamin A content less subject to destruction through exposure to air and atmospheric temperature.

An additional object is to provide a method for treating provitamin A-containing dried cereal grasses and like products to render carotene and other provitamins contained therein less subject to deterioration through exposure to air, light and heat.

An additional object is to provide a method for treating a provitamin A-containing substance to render the provitamin A contained therein more stable under conventional storage conditions.

An additional object is to provide a dried plant product suitable for an animal food in which the provitamin A content is of increased resistance to deterioration on storage.

According to the process of the present invention, dried plant tissue is treated with a low-boiling organic liquid until substantially complete solution of carotene and other provitamins A in the organic liquid is effected and the low-boiling organic liquid subsequently volatilized directly from the mass, i. e., without separation therefrom in liquid phase, to leave the provitamins and other substances soluble in the liquid as a thin film on the surfaces of and in the interstices of the plant tissues. The provitamin A content of plant tissues thus treated is found to be highly stabilized against deteriorating influences of air, light, and heat as compared with the original untreated tissues. The treated product can be stored for much longer periods of time, and without as great a loss of provitamin A content, than is possible under like conditions with untreated dried tissue. The treated product can be stored without protection from light, air, and heat and without undue loss of provitamin A content.

It is thought that plant lipoids, such as tocopherols and lecithins and other natural stabilizers for provitamins, as well as fatty constituents present in the plant tissues, are extracted from the tissues along with the provitamins A during the process and these substances remain mixed intimately with the provitamins following volatilization of the low-boiling liquid. Under such condition the full effectiveness of the natural stabilizers is realized.

A preferred modification of the invention comprises the inclusion in the mixture of plant tissue and organic liquid of a minor proportion, usually less than 5 per cent of the weight of the plant tissue, of glyceride oil, i. e. of a liquid glyceride. When a glyceride oil is included in the mixture of feed and organic liquid the amount of oily residue left in the dried mass after volatilization of the organic liquid is increased and this increases materially the degree of stabilization of the provitamins. It may be that in such case the provitamins and stabilizers remain largely dissolved in the residual glyceride oil following volatilization of the low-boiling organic liquid, and better contact and mixing of the provitamins and stabilizers is effected.

It may be also that the glyceride oil used not only serves to promote better contact and mixing of the provitamins and stabilizers, but that by serving as a solvent for the provitamin A it helps to protect the provitamins from certain destructive light rays and reduces materially their contact with air.

A further preferred modification of the invention comprises the inclusion in the mixture of low-boiling organic treating liquid and plant product of an added non-volatile stabilizer for provitamin A, either with or without the use of a glyceride oil, which remains in and on the plant tissues when the treating liquid is removed and which further stabilizes the provitamin A.

Although it is preferred to include a glyceride oil along with the treating fluid to serve as a solvent or blending residue for the soluble constituents of the plant tissue upon removal of the treating fluid, it should be mentioned that the invention also includes the use of a low-boiling treating fluid in the manner prescribed but without the use of a glyceride oil. Using such procedure, and particularly when supplementary stabilizers are used, a considerable and often satisfactory increase in stability of provitamin A in many plant products is obtained. This is particularly true in the case of plant products having a high content of natural stabilizers, such as carrot meal, alfalfa leaf meal and many cereal grasses.

Even here, however, the use of a glyceride oil is preferred since better results are obtained thereby, regardless of whether or not a supplementary stabilizer is used. It is usually also more economical to use a glyceride oil to enhance the stabilizing action of the natural stabilizers than it is to omit the glyceride oil and attain the same degree of stabilization by using a supplementary added stabilizer.

Still a further modification of the invention contemplates the inclusion in the mixture comprising a plant tissue and a low-boiling organic liquid prior to the volatilization of the latter of a nutritionally valuable substance which it may be desirable to have present and evenly distributed in the treated feedstuff. Such nutritionally beneficial substances include particularly vitamins, e. g., vitamin K, vitamin E and vitamin D, not ordinarily present in sufficient amounts in the plant tissue treated, medicinals of various sorts, substances calculated to make the mixture more attractive, more appetizing, or more digestible to the animal, and others. Such substances may be stirred into the mixture at any time prior to the volatilization of the organic liquid. Such procedure is, of course, of most benefit when the nutritionally valuable substance is soluble in the organic liquid. Mixtures may be prepared by the method of the invention containing nutritionally valuable substances in proportions higher than necessary in a feed and the mixture then mixed with other feeds to form a balanced ration.

The process is carried out by mixing the dried plant product or tissue with the low-boiling organic liquid to form a slurry and stirring the mixture, usually at ordinary or only slightly elevated temperatures, until substantially complete dissolving of the substances in the plant tissue which are soluble in the liquid is accomplished. The organic liquid is then removed from the mixture by vaporization in any convenient way, usually in a current of superheated steam. Subatmospheric pressure distillation may be employed, if desirable or necessary, to reduce the distillation temperature to avoid possible thermal injury to the provitamins A or other constituents of the plant tissues. In certain instances it may be desirable to agitate the mass to some degree during vaporization of the organic liquid to insure substantially even distribution throughout the mass of non-volatile constituents dissolved in the liquid. Glyceride oils and stabilizers used in the process are incorporated in the mixture prior to vaporization of the organic liquid. After vaporization of the organic liquid, the dry product is stored in desired manner.

The process is applicable to substantially any dried or dehydrated plant product which contains carotene or other pro-vitamin A. Such products include clover, timothy, alfalfa, millet, corn, and soy bean hay. The product is preferably ground before being treated so as to provide better and quicker extraction and to provide a more uniformly processed residue. The method is of particular value in the processing of alfalfa meal due to its fine state of subdivision and its valuable provitamin A content.

The organic liquid used in the extraction may be any low-boiling organic liquid in which provitamins A and stabilizers therefor, such as tocopherols and lecithins occurring naturally in the product being treated, or others which are added, are soluble, preferably one in which chlorophyl is substantially insoluble. Preferred liquids include halogenated hydrocarbons, such as dichloropropane, methylene chloride, methyl chloride, chloroform, tetrachloroethylene, dichloroethane, butyl chloride, trichloroethylene and amylene chloride, and hydrocarbons, such as hexane, heptane, cyclohexane, methylcyclohexane, benzene and toluene. Certain bromohydrocarbons may hydrolyze in the presence of traces of moisture to such a degree as to cause an undesirable acid reaction in the mixture and corrosion of equipment, but other bromine-containing compounds, such as ethylene chlorobromide, although costly, may be used with entire satisfaction. Fluorinated hydrocarbons and halohydrocarbons containing two or more different halogens may be used provided they leave no toxic or otherwise harmful residue in the feed.

The term "low-boiling organic liquid" as used herein refers to an organic liquid boiling below about 150° C., preferably below about 100° C. under a pressure of one atmosphere. Higher boiling liquids are undesirable as the high temperature necessary to volatilize them may prove injurious to the plant product. Distillation in vacuo will alleviate this difficulty to some extent. When a liquid boiling at sub-atmospheric temperature is employed, the extraction and distillation may be carried out under pressure if desirable or necessary.

Sufficient organic liquid should be employed in the mixture to permit some stirring or agitation of the mass but the ratio of organic liquid to dehydrated plant tissue employed is not critical. The ratio should be as small as convenient to reduce unavoidable losses in handling and to increase the effective capacity of the equipment. Good results have been obtained with as small a ratio as 1.75 parts by volume (in milliliters) of solvent to one part by weight (in grams) of plant tissue when treating alfalfa meal and it need not generally be greater than 3.00 parts by volume to one part by weight of plant tissue.

Substantially any glyceride oil can be used in the preferred modification of the process. Refined or crude vegetable oils, such as corn, cotton, peanut or soybean oil, or refined or crude animal oils, such as fish oil, or combinations of these give good results. A crude oil is usually preferred to a refined oil because such crude oils frequently contain an appreciable amount of tocopherols, lecithins, cephalin or other substance occurring naturally therein which act as stabilizers for the provitamin A and which reinforce or augment the stabilizing action of these and similar acting substances already present in the plant product. Crude soybean oil is a preferred oil because of its high content of the above substances. The so-called "foots" or settlings obtained in the process of refining glyceride oils may be used, if desired. Oils may be used which in themselves contain vitamins or other nutritionally beneficial substances and the content of such substance in the final product thereby increased.

When a glyceride oil is employed in the process it is usually used in an amount of from about one to about 5 per cent of the weight of the plant product being treated. When used in an amount less than about one per cent the full value of the oil is not realized and when more than about 5 per cent is used, no added advantage is realized and the final product is frequently somewhat oily in appearance and to the touch. From about 2 to about 3 per cent of glyceride oil has given good results with respect to economy, optimal stabilization and physical properties of the resulting product. More than 5 per cent of glyceride oil may, of course, be used when the presence of a larger proportion of oil in the final product is desirable for nutritional or other purposes.

A product made from dehydrated alfalfa leaf meal containing 2 to 3 per cent of added glyceride oil is not oily to the touch and flows in much the same manner as ordinary dehydrated leaf meal. The fact that it is not dusty and has a brighter green color than the original alfalfa leaf meal, is advantageous. The process may be carried out within a wide range of combinations of oil, depending on the degree of stabilization desired, the type of product desired, and the cost of the oil. More oil tends to take the place of an added chemical stabilizer, and therefore, at times may be desirable.

A preferred source of glyceride oil comprises an oil-bearing seed, such as cotton seed, peanuts, soybeans and the like, a sufficient amount of the seed, preferably crushed, being added to the mixture prior to volatilization of the organic liquid to provide the desired amount of glyceride oil. Under such conditions, the glyceride oil is extracted from the seed or meal during the process. Oil-bearing meal, such as cotton seed meal, soybean meal or peanut meal, from an oil pressing operation, is frequently employed.

Chemical stabilizers for provitamin A which may be used in the process to augment the action of the natural stabilizers contained in the plant tissue include nordihydroguaiaretic acid and its esters, pyrogallol, ascorbic acid, hydroquinone and its esters and ethers, thiodipropionic acid ($S(CH_2CH_2COOH)_2$) and its esters, tocopherols, lecithins, certain organic acids, other stabilizers occurring naturally in the phospholipoid fraction of many types of vegetable matter, and many others. Generally speaking, a stabilizer should be used which is nutritionally valuable and acceptable. The invention is not limited as to the proportion of added stabilizer used since this will be dependent upon a number of factors, such as the effectiveness of the particular stabilizer, the amount and kind of glyceride oil used, the proportion and effectiveness of stabilizers occurring naturally in the product being treated, and many others.

It should be pointed out that the deterioration of the naturally occurring provitamin A in harvested or processed plant products takes place progressively over a period of time. The rate of deterioration is usually low for a certain period of time and then becomes rapidly higher until a large proportion of the provitamin has been destroyed or inactivated. Such phenomena are characteristic of processes involving auto-oxidation, there usually being a period of more or less duration, referred to as an induction period, wherein the oxidative reaction proceeds only slowly, followed by a period of rapid oxidation. Anti-oxidants used to alter the course of such reactions usually serve merely to prolong the induction period. It may be that the deterioration of provitamin A is somewhat of the same nature. It has been observed that most stabilizers for provitamin A, including those referred to herein, serve principally to prolong the period of a low rate of deterioration, rather than to render the provitamin stable over an indefinite period, the effectiveness of a particular stabilizer being gauged by the extent of such prolongation. This phenomenon and method of evaluation of stabilizers is well understood by those familiar with the art.

Certain advantages of the invention are apparent from the following examples which are given by way of illustration only and are not to be construed as limiting. Carotene determinations referred to in the examples were made by the method of Wall and Kelly (Ind. Eng. Chem., Anal. Ed., 15, 1518 (1943)).

EXAMPLE 1

One portion by weight (in grams) of alfalfa meal was mixed with about two portions by volume (in milliliters) of hexane and stirred to insure thorough mixing and the mass allowed to stand for about 30 minutes. The hexane was then vaporized by passing steam at about 120° C. through the mixture. The hexane-free product was similar in appearance to the original meal.

The procedure was repeated twice and there was included in the two mixtures prior to stirring an amount of refined corn oil equal to 7 per cent and 14 per cent, respectively, of weight of the meal treated. The amount of carotene in milligrams per gram was determined in each portion of treated meal immediately after removal of the hexane and after storing at 60° C. for 143 hours and for 287 hours. Similar determinations were made on an untreated portion for comparative purposes. In the accompanying Table I there are given the percentages of carotene remaining in each portion at the end of 143 hours and of 287 hours, based on the amount found in the portion immediately after treating and before storage at 60° C.

*Table I*

| Treatment given portion | Per Cent of Original Carotene Remaining After— | |
|---|---|---|
| | 143 Hrs. | 287 Hrs. |
| Untreated | 44 | 32 |
| Hexane alone | 48 | 39.5 |
| Hexane+7 per cent corn oil | 69 | 55 |
| Hexane+14 per cent corn oil | 77.5 | 61.5 |

EXAMPLE 2

A quantity of alfalfa meal was divided into portions. One portion by weight (in grams) was mixed with about 1.75 portions by volume (in milliliters) of trichloroethylene ($C_2HCl_3$) stirred thoroughly, and the mixture allowed to stand for 30 minutes. Trichloroethylene was then vaporized directly from the mixture in vacuo. The process was repeated several times, an added stabilizer being mixed with the wet meal in each instance before vaporization of the trichloroethylene. Stabilizers used included nordihydroguaiaretic acid (NDGA), crude soy bean oil (CSBO), and a mixture of the two. The treated samples were then stored at 35° C., along with an untreated sample for comparative purposes.

The amount of carotene in each sample was determined from time to time, the results being given in the accompanying Table II. In the table there are also given the percentages of crude soy bean oil and of nordihydroguaiaretic acid used, based on the weight of the meal in the portion treated.

*Table II*

| Treatment given portion | Carotene in Milligrams per Gram in Portion After Storage at 35° C. for— | | | | | | |
|---|---|---|---|---|---|---|---|
| | 0 Hr. | 49 Hrs. | 96 Hrs. | 144 Hrs. | 242 Hrs. | 314 Hrs. | 410 Hrs. |
| Untreated | 0.211 | 0.188 | 0.179 | 0.176 | 0.170 | 0.161 | 0.157 |
| $C_2HCl_3$ alone | 0.211 | 0.200 | 0.187 | 0.183 | | 0.183 | 0.166 |
| $C_2HCl_3$; 0.05 per cent NDGA | 0.211 | 0.202 | 0.191 | | | | |
| $C_2HCl_3$; 1.3 per cent CSBO | 0.215 | 0.201 | 0.197 | 0.193 | 0.185 | 0.188 | 0.179 |
| $C_2HCl_3$; 1.3 per cent SCBO; 0.05 per cent NDGA | 0.215 | | 0.207 | 0.198 | 0.185 | | |
| $C_2HCl_3$; 2.5 per cent CSBO | 0.212 | 0.207 | 0.195 | 0.188 | 0.185 | 0.192 | 0.179 |
| $C_2HCl_3$; 2.5 per cent CSBO; 0.05 per cent NDGA | 0.224 | 0.214 | 0.208 | 0.201 | 0.203 | | |

EXAMPLE 3

Separate lots of alfalfa meal were treated with trichloroethylene and with trichloroethylene and 2.5 and 5.0 per cent respectively of crude soy bean oil, based on the weight of meal, as in Example 2, and stored at 50° C. One portion of untreated meal was also stored for comparative purposes. Data on the carotene content after varying periods of storage of the four portions were obtained. These are given in the accompanying Table III.

*Table III*

| Treatment given portion | Carotene in Milligrams per gram in portion after storage at 50° C. for— | | | | | |
|---|---|---|---|---|---|---|
| | 0 Hr. | 72 Hrs. | 96 Hrs. | 144 Hrs. | 192 Hrs. | 240 Hrs. |
| Untreated | 0.215 | 0.159 | 0.148 | 0.123 | 0.106 | 0.101 |
| $C_2HCl_3$; 2.5 per cent CSBO | 0.215 | 0.192 | 0.189 | 0.161 | 0.152 | 0.150 |
| $C_2HCl_3$; 5.0 per cent CSBO | 0.215 | 0.192 | 0.189 | 0.159 | 0.155 | 0.157 |

EXAMPLE 4

One portion of alfalfa meal was treated with trichloroethylene and refined corn oil and another portion was treated with trichloroethylene, refined corn oil and the lauryl ester of thiodipropionic acid (LTDP) using substantially the procedure of Example 2. Corn oil was used at the rate of 5 per cent of the weight of meal in each case and the lauryl ester at the rate of 0.25 per cent of the weight of the meal in the second case. The treated meal was stored at 60° C. and the carotene content determined in each portion from time to time.

The data obtained are given in Table IV.

*Table IV*

| Treatment given Portion | Carotene in Milligrams per gram in portion after storage at 60° C. for— | | | | |
|---|---|---|---|---|---|
| | 0 Hr. | 28 Hrs. | 53 Hrs. | 101 Hrs. | 173 Hrs. |
| $C_2HCl_3$ 5 per cent corn oil | 0.208 | 0.174 | 0.171 | 0.151 | 0.123 |
| $C_2HCl_3$ 5 per cent corn oil 0.25 per cent LTDP | 0.208 | | 0.207 | 0.173 | 0.122 |

We claim:

1. The method which includes: mixing a low-boiling organic liquid from the group consisting of hydrocarbons and halohydrocarbons with a dry comminuted plant leaf tissue having a low affinity for fatty material and containing naturally therein both a provitamin A and a stabilizer for the provitamin A to dissolve substantially all of the provitamin A and stabilizer; vaporizing the organic liquid directly from the mixture; and recovering the plant tissue in a form wherein the naturally occurring provitamin A is stable over a longer period of time than in the untreated tissue.

2. The method of claim 1 wherein the organic liquid has a boiling point below about 150° centigrade under a pressure of one atmosphere.

3. The method of claim 1 wherein the organic liquid is non-reactive with the provitamin A under the conditions of mixing and vaporization.

4. The method of claim 1 wherein the organic liquid is a halohydrocarbon.

5. The method of claim 1 wherein the organic liquid is a hydrocarbon.

6. The method of claim 1 wherein the organic liquid is trichloroethylene.

7. The method of claim 1 wherein the provitamin A is carotene.

8. The method for rendering less subject to deterioration on storage a provitamin A occurring naturally in a plant tissue together with a stabilizing substance therefor, which includes: mixing the dried plant tissue containing the provitamin A and a stabilizer with a glyceride oil and a low-boiling organic liquid from the group consisting of hydrocarbons and halohydrocarbons in which the glyceride oil, the provitamin A and the naturally occurring stabilizer are soluble to substantially dissolve the glyceride oil, provitamin A and stabilizer; vaporizing the organic liquid directly from the mixture; and recovering the plant tissue in a form wherein the naturally occurring provitamin A is stable over a longer period of time than in the untreated tissue.

9. The method of claim 8 wherein the glyceride oil is a vegetable oil.

10. The method of claim 8 wherein the glyceride oil is a crude oil.

11. The method of claim 8 wherein the glyceride oil is included in the mixture in the form of an oil-containing seed.

12. The method of claim 8 wherein the glyceride oil contains a stabilizer for the provitamin A.

13. The method of claim 8 wherein the glyceride oil is a soy bean oil.

14. The method for rendering less subject to deterioration on storage a provitamin A occurring naturally in a plant leaf tissue together with a stabilizer therefor, which includes: mixing the dried plant tissue containing the provitamin A and stabilizer with a glyceride oil, an additional quantity of a stabilizer for the provitamin A and a low-boiling organic liquid from the group consisting of hydrocarbons and halohydrocarbons in which the provitamin A, stabilizer and glyceride oil are soluble; vaporizing the organic liquid directly from the mixture; and recovering the plant tissue in a form wherein the naturally occurring provitamin A is stable over a longer period of time than in the untreated tissue.

15. The method of claim 14 wherein the added stabilizer is nordihydroguaiaretic acid.

16. A processed dry vegetable tissue, which in its natural state contains a provitamin A and a stabilizer therefor, wherein the naturally occurring provitamin A and stabilizer are in the form of an intimate mixture on the surface and in the interstices of the tissue and wherein the stabilizing action of the stabilizer on the provitamin A is effective over a longer period of time than in the unprocessed tissue.

17. The product of claim 16 which includes an added glyceride oil in intimate contact with the provitamin A and stabilizer.

18. The product of claim 16 which includes an added quantity of a provitamin A in addition to that occurring naturally in the unprocessed vegetable tissue.

19. The product of claim 16 which includes an added quantity of a stabilizer for a provitamin A in addition to that occurring naturally in the unprocessed vegetable tissue.

HAROLD G. PETERING.
WILBUR H. PETERING.

REFERENCES CITED

The following references are of record in the file of this patent:

UNITED STATES PATENTS

| Number | Name | Date |
| --- | --- | --- |
| 2,133,362 | Schnabel | Oct. 18, 1938 |
| 2,198,214 | Musher | Apr. 23, 1940 |
| 2,345,571 | Briod et al. | Apr. 4, 1944 |
| 2,401,293 | Buxton et al. | June 4, 1946 |